(12) United States Patent
Yadav et al.

(10) Patent No.: US 10,795,588 B1
(45) Date of Patent: *Oct. 6, 2020

(54) CHECK POINT RECOVERY BASED ON IDENTIFYING USED BLOCKS FOR BLOCK-BASED BACKUP FILES

(71) Applicant: EMC IP Holding Company LLC, Hopkinton, MA (US)

(72) Inventors: Rangapuram Ravi Kishore Yadav, Bangalore (IN); Pavan Kumar Dattatreya Ati, Bangalore (IN); Sridhar Surampudi, Rajahmundry (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 109 days.

This patent is subject to a terminal disclaimer.

(21) Appl. No.: 15/192,841

(22) Filed: Jun. 24, 2016

(51) Int. Cl.
*G06F 3/06* (2006.01)

(52) U.S. Cl.
CPC ............ *G06F 3/0619* (2013.01); *G06F 3/064* (2013.01); *G06F 3/067* (2013.01)

(58) Field of Classification Search
CPC ............... G06F 3/0619; G06F 11/1446; G06F 11/1456; G06F 11/1458
See application file for complete search history.

(56) References Cited

U.S. PATENT DOCUMENTS

| 8,386,733 | B1* | 2/2013 | Tsaur | G06F 11/1458 |
| | | | | 711/163 |
| 9,852,200 | B1* | 12/2017 | Paulzagade | G06F 17/30575 |
| 2006/0143501 | A1* | 6/2006 | Tormasov | G06F 11/1417 |
| | | | | 714/6.3 |
| 2007/0239806 | A1* | 10/2007 | Glover | G06F 11/1435 |
| 2012/0078855 | A1* | 3/2012 | Beatty | G06F 11/1451 |
| | | | | 707/676 |
| 2016/0041884 | A1* | 2/2016 | Iwasaki | G06F 16/162 |
| | | | | 707/646 |

OTHER PUBLICATIONS

IBM, "IBM Spectrum Scale V4.2: Administration and Programming Reference," SA23-1452-06, May 2016, pp. 46-74.*
IBM, "IBM Spectrum Scale V4.2 product documentation," May 7, 2016.*

* cited by examiner

*Primary Examiner* — Tracy A Warren
(74) *Attorney, Agent, or Firm* — Dergosits & Noah LLP; Todd A. Noah (57) ABSTRACT

Check point recovery based on identifying used blocks for block-based backup files is described. At least one data block is identified that is used by a system since a point in time in response to receiving a request to restore the system based on the point in time. At least one data block, corresponding to the identified at least one data block, is recovered from at least one backup file for the system, without reading each data block backed up via the at least one backup file for the system. The system is restored based on the recovered at least one data block.

18 Claims, 5 Drawing Sheets

CHECK POINT RECOVERY BASED ON IDENTIFYING USED BLOCKS FOR BLOCK-BASED BACKUP FILES

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

In data transmission and data storage, a block is a sequence of bytes or bits having a fixed length, or block size. The process of putting data into blocks is used to facilitate the handling of a data-stream by a computer program receiving data. Blocked data is normally read a whole block at a time. Blocking is almost universally employed when storing data to 9-track magnetic tape, to rotating media such as floppy disks, hard disks, optical disks, and to NAND flash memory. Most file systems are based on a block device, which is a level of abstraction for the hardware responsible for storing and retrieving specified blocks of data, though the block size in file systems may be a multiple of the physical block size. In many file systems, a single block might contain only a part of a single file. Block storage is normally abstracted by a file system or database management system for use by applications and end users. An incremental block-based backup involves taking a snapshot of a file system, reading the blocks that have been modified since the last backup, and storing copies of the modified blocks into some block backed backup format, such as virtual hard disk (VHD).

DETAILED DESCRIPTION

A backup/restore application may create a full backup file that includes all of a data object or the parts of the data object that are used. A backup/restore application may also create an incremental backup file that includes only changes made to the data object since a selected time, such as a previous backup of the data object.

Figure 1:
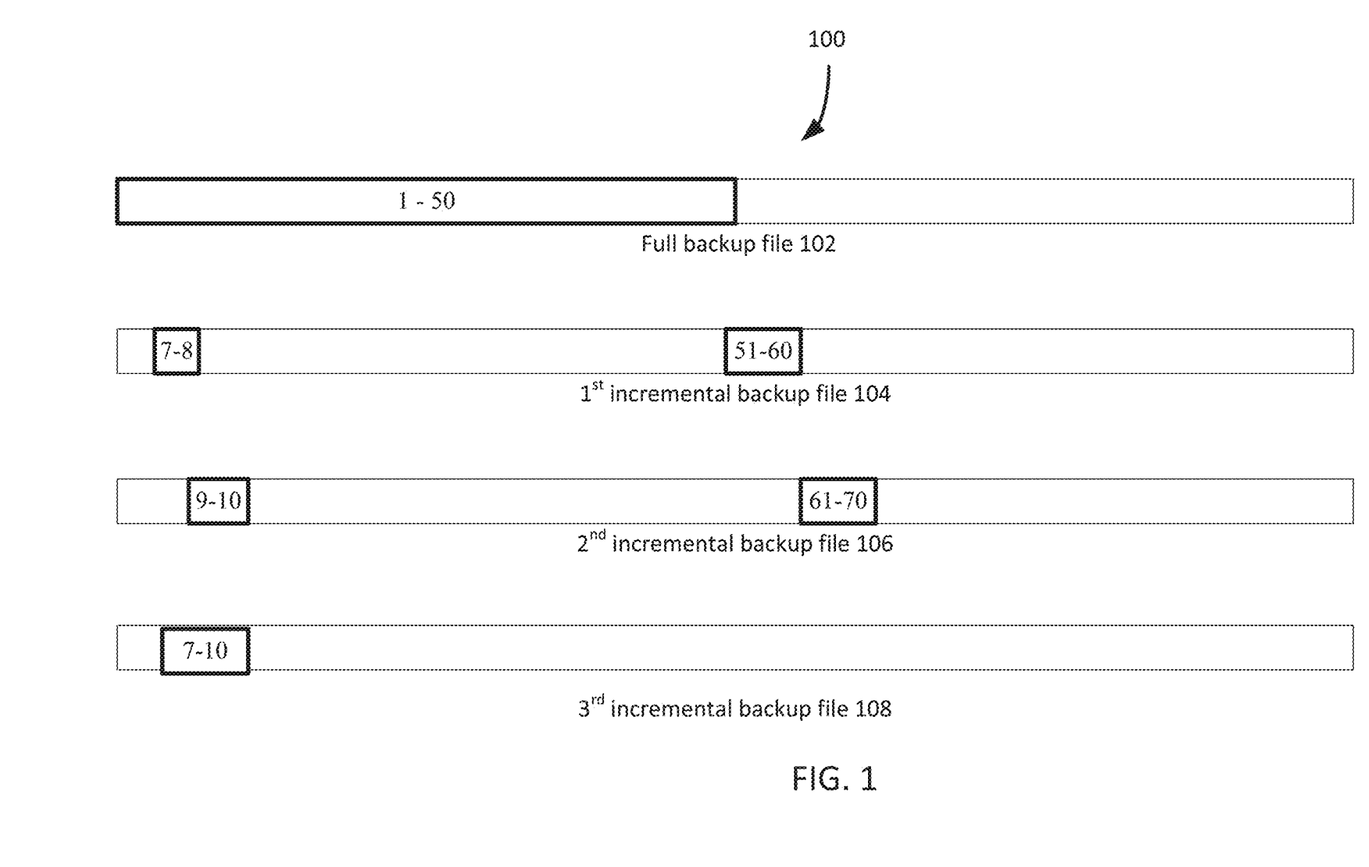
FIG. 1 illustrates a block diagram of example blocks for check point recovery based on identifying used blocks for block-based backup files, under an embodiment.

FIG. 1 illustrates a diagram of example blocks for check point recovery based on identifying used blocks for block-based backup files, under an embodiment. For example, a backup/restore application creates the first backup file, a full backup file 102 that includes blocks 1 to 50, for a 100 block volume. When the backup/restore application creates the second backup file for the volume, blocks 7-8 have been modified and blocks 51-60 have been added since the full backup file 102 was created, so the backup/restore application creates a first incremental backup file 104 that includes 12 blocks, the recently changed blocks 7-8 and 51-60. For this example, blocks 51-60 are added data blocks while blocks 7-8 are modified metadata blocks that correspond to the data blocks 51-60. When the backup/restore application creates the third backup file for the volume, blocks 9-10 have been modified and block 61-70 have been added since the first incremental backup file 104 was created, so the backup/restore application creates a second incremental backup file 106 that includes 12 blocks, the recently changed blocks 9-10 and 61-70. For this example, blocks 61-70 are added data blocks while blocks 9-10 are modified metadata blocks that correspond to the data blocks 61-70. When the backup/restore application creates the fourth backup file for the volume, block 51-70 have been deleted since the second incremental backup file 106 was created, thereby resulting in the modification of the metadata blocks 7-10 that correspond to the deleted data blocks 51-70. When a file is deleted, the corresponding data blocks are identified as unused, and only the corresponding metadata is modified. Consequently, the backup/restore application creates a third incremental backup file 108 that includes only 4 blocks, the recently changed metadata blocks 7-10, but does not include any changes to the data blocks 51-70, other than their identification as unused. Next, a system user requests the backup/restore application to restore the volume to the state of the most recent backup file, which is the third incremental backup file 108. A previous type of backup/restore application recovers blocks 1-6 from the full backup file 102, recovers blocks 7-10 from the third incremental backup file 108, recovers blocks 11-50 from the full backup file 102, recovers blocks 51-60 from the first incremental backup file 104, and recovers blocks 61-70 from the second incremental backup file 106. After recovering blocks 1-70 from the backup files 102-108, the previous type of backup/restore application restores these 70 recovered files to the volume.

However, the recovered metadata blocks 7-10 no longer correspond to the recovered data blocks 51-70. Without corresponding metadata blocks, attempted use of the recovered data blocks 51-70 would create problems. If the system user had wanted to recover and then use the data blocks 51-70, the system user could have requested the backup/restore application to restore the volume to the state of the second incremental backup file 106, which includes the metadata for the data blocks 51-70 because the backup/restore application created the second incremental backup file 106 before the data blocks 51-70 were deleted. Therefore, recovering the data blocks 51-70 in response to a request to restore the volume to the state of the third incremental backup file 108 is not only unnecessary, but a waste of system resources such as time, network bandwidth, and CPU utilization, thereby resulting in a recovery that is slow and inefficient.

Embodiments herein provide check point recovery based on identifying used blocks for block-based backup files. At least one data block is identified that is used by a system since a point in time, in response to receiving a request to restore the system based on the point in time. At least one data block, corresponding to the identified at least one data block, is recovered from at least one backup file for the system, without reading each data block backed up via the at least one backup file for the system. The system is restored based on the recovered at least one data block.

Based on the previous example, a new type of backup/restore application receives a request from the system user to restore the volume to the state of the most recent backup file, which is the third incremental backup file 108. The new backup/restore application uses corresponding disk layout files for the backup files 102-108 to identify that only blocks 1-50 were being used and that blocks 51-70 were unused at the time of the creation of the most recent backup file, the third incremental backup file 108. Therefore, blocks 51-70 do not need to be recovered. Consequently, the new backup/restore application only recovers blocks 1-6 from the full backup file 102, recovers blocks 7-10 from the third incremental backup file 108, and recovers blocks 11-50 from the full backup file 102. The new backup/restore application restores the recovered blocks 1-50 to the volume, having recovered only 50 blocks (1-50) and restored only 1 blocks (1-50), instead of recovering 70 blocks and restoring 70 blocks, as would have been required by any previous type of backup/restore application.

Figure 2:
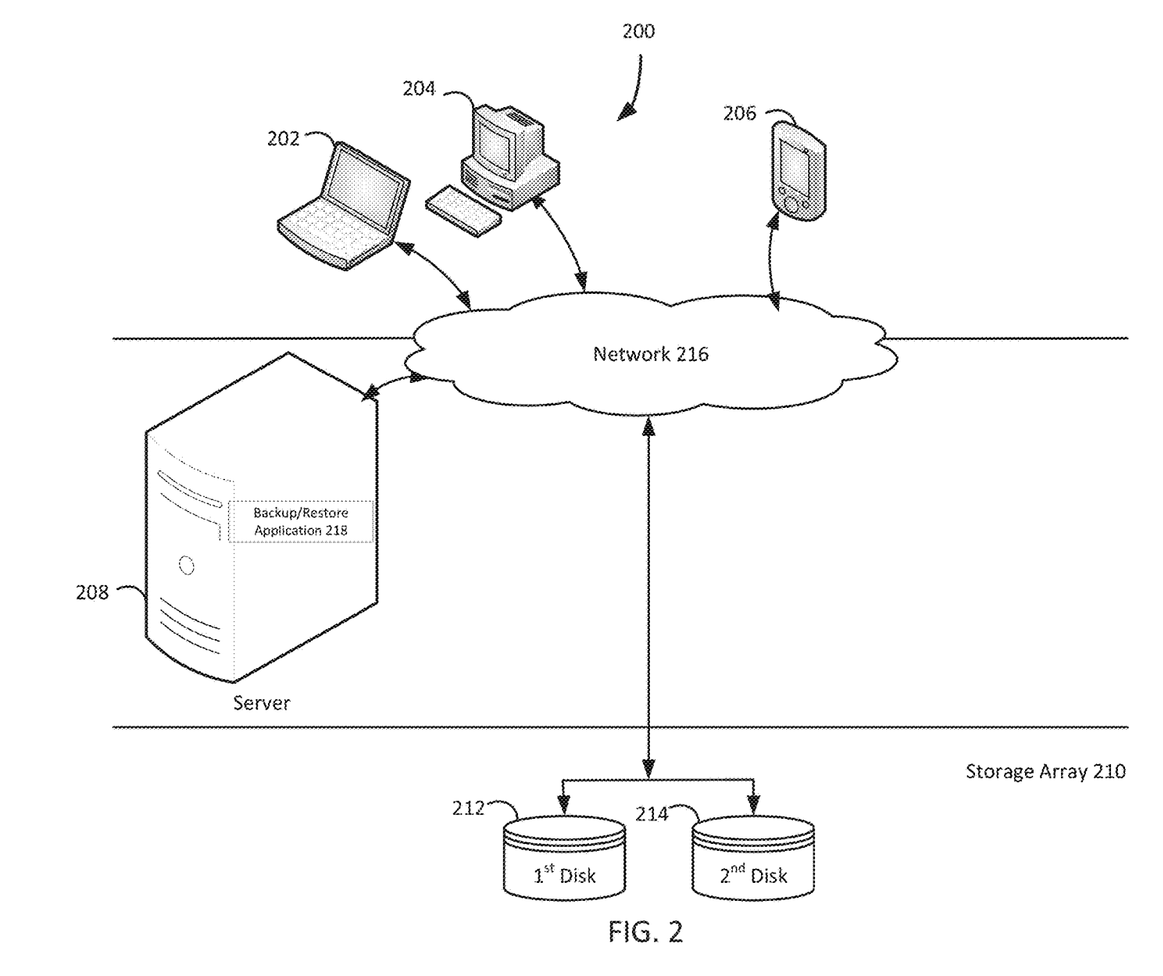
FIG. 2 illustrates a block diagram of an example system for check point recovery based on identifying used blocks for block-based backup files, under an embodiment.

FIG. 2 illustrates a diagram of a system for check point recovery based on identifying used blocks for block-based backup files, under an embodiment. As shown in FIG. 2, a system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a server 208, and a storage array 210 that may be provided by a hosting company. Although FIG. 2 depicts the first client 202 as a laptop computer 202, the second client 204 as a personal computer 204, and the third client 206 as a personal digital assistant 206, each of the clients 202-206 may be any type of computer, such as a server. The storage array 210 includes a first disk 212 and a second disk 214. The clients 202-206, the server 208, and the storage array 210 communicate via a network 216. Although FIG. 2 depicts the system 200 with three clients 202-206, one server 208, one storage array 210, two disks 212-214, and one network 216, the system 200 may include any number of clients 202-206, any number of servers 208, any number of storage arrays 210, any number of disks 212-214, and any number of networks 216. The clients 202-206 and the server 208 may each be substantially similar to the system 500 depicted in FIG. 5 and described below.

The server 208, which may be referred to as a backup server 208, includes a backup/restore application 218 that may create backup files of data objects for the clients 202-206, and execute a rollback based on the backup files stored on the storage array 210, which may be stored using the VHDx format for Microsoft Windows®. The backup/restore application 218 may provide centralized administration, such as scheduling, monitoring, and managing backup operations and backup files. The backup/restore application 218 can enable the storing of backup operation schedules, client policies, and client configurations. The backup/restore application 218 may provide a unique interface to the clients 202-206 during login, and assist the backup server 208 in authenticating and registering the clients 202-206. The backup/restore application 218 can send backup/restore work orders to the clients 202-206, which may receive and process the work orders to start a backup or restore operation. The backup/restore application 218 maintains a local database of all processes that execute on the backup server 208. The backup/restore application 218 executes server-side processes for a system administrator's graphical management console, which may enable the system administrator to use command line interface tools for queries. For example, a system administrator identifies the clients 202-206 registered with the backup server 208.

Although FIG. 2 depicts the backup/restore application 218 residing completely on the backup server 208, the backup/restore application 218 may reside in any combination of partially on the backup server 208 and partially on the clients 202-206, such as by residing as data management applications on the clients 202-206. Even though the following paragraphs describe EMC Corporation's Avamar® backup/restore application and EMC Corporation's NetWorker® backup/restore application as examples of the backup/restore application 218, the backup/restore application 218 may be any other backup/restore application which provides the backup/restore functionalities described in the Background section.

The backup/restore application 218 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 218 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

Figure 3:
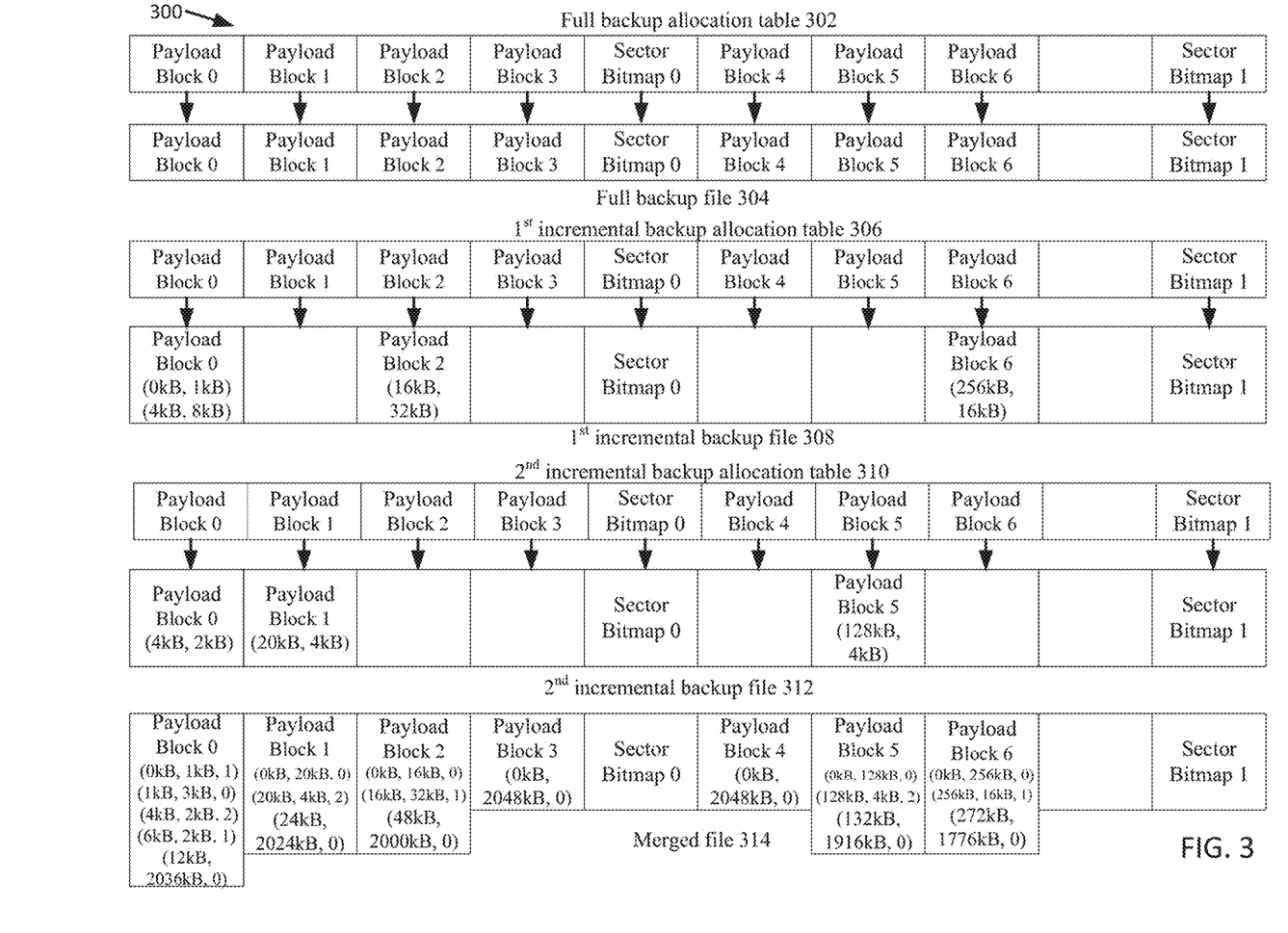
FIG. 3 illustrates a block diagram of example blocks for check point recovery based on identifying used blocks for block-based backup files, under an embodiment.

The backup/restore application 218 can receive a request from any one of the clients 202-206 to restore the requesting client to a state that was backed up at a user-specified point in time, which may be referred to as a checkpoint. For example, the backup/restore application 218 receives a request from the system user to restore the first client 202 to the state of the most recent backup file, which is an incremental backup file. For this example, the backup/restore application 218 has already created the first backup allocation table, a full backup allocation table 302, the first backup file, a full backup file 304, the second backup allocation table, a first incremental backup allocation table 306, the second backup file, a first incremental backup file 308, the third backup allocation table, a second incremental backup allocation table 310, and the third backup file, a second incremental backup file 312, which are depicted in FIG. 3 and described below in reference to FIG. 3. Each of the backup files 304, 308, and 312 corresponds to disk layout files that provide information about the state of the corresponding volume when the backup files 304, 308, and 312 were created.

The examples describing the backup files 304, 308, and 312 are based on the first client 202 having 14,336 blocks of data that are backed up, with a block size of 1,024, such that payload block 0, payload block 1, payload block 2, payload block 3, payload block 4, payload block 5, and payload block 6 of the backup files 304, 308, and 312 each store 2,048 of the 14,336 blocks of the first client 202. Although this example is based on each client block containing 1 kB of data and each payload block containing 2 MB of client block data, each client blocks may contain any amount of data and each payload block may contain any amount of data. Each of the backup files 304, 308, and 312 includes sector bitmap 0, which is a block map that identifies which client blocks are stored in the corresponding payload blocks 0, 1, 2, and 3, and sector bitmap 1, which is a block map that identifies which client blocks are stored in the corresponding payload blocks 4, 5, and 6.

Having received a request to restore a client, the backup/restore application 218 identifies at least one data block that is used by the client since the checkpoint. When a system user requests to restore a client to the state of a backup file that was created at the user-specified checkpoint, the backup/restore application 218 identifies the blocks to recover based on the union of all the different blocks that have been used since the user-specified backup file. Applying an example to the full backup file 304, the backup/restore application 218 uses the disk layout files corresponding to the full backup file 304 to identify that all 14,336 blocks of data stored by the full backup file 304 are identified as used.

An ext3/4 disk layout file is an example of a disk layout file, and includes the following for each block group: a super block that records information about the enclosing file system (such as block counts, inode counts, supported features, and maintenance information), block group descriptors, a data block bitmap, an inode bitmap, inode tables, and data blocks. The ext4 format allocates storage space in units of blocks, each of which is a group of sectors between 1 kB and 64 kB, where the number of sectors is an integral power of 2. Block size is specified during the creation of the corresponding file system, and may be 4 kB. These blocks are grouped into larger units referred to as block groups. Each block group has a data block bitmap and an inode bitmap pertaining to the block group. Each bit in a data block bitmap specifies whether a corresponding data block is either used or unused at a specific point in time, such as when the corresponding backup file is created. The backup/restore application 218 can parse an ext3/4 disk layout file to obtain the block size and the blocks per group from a super block for a block group for a backup file, calculate the total number of block groups by dividing the total number of data blocks for the system by the blocks per group, obtain the used blocks for the block group from the data block bitmap for the block group, and then obtain the used blocks for all block groups for the backup file from the data block bitmaps for all block groups for the backup file.

Applying an example to the first incremental backup file 308, the backup/restore application 218 uses the disk layout files corresponding to the first incremental backup file 308 to identify that client blocks 1, 5-9, 4,113-4,129, and 12,545-12,561 stored by the first incremental backup file 308 are identified as used. Applying an example to the second incremental backup file 312, the backup/restore application 218 uses the disk layout files corresponding to the second incremental backup file 312 to identify that client blocks 5-6, 2,069-2,073, and 10,369-10,373 stored by the second incremental backup file 312 are identified as used, and that client blocks 12,288-14,336 stored by the second incremental backup file 312 are identified as unused due to the deletion of client blocks 12,289-14,337 prior to the creation of the second incremental backup file 312. Therefore, the backup/restore application 218 identifies the client blocks 1-12,288 as used and identifies the client blocks 12,289-14,337 as unused prior to recovering any blocks to restore the first client 202 to the state of the most recent backup file, which is the second incremental backup file 312. Then the backup/restore application 218 uses the full block allocation table 302 to locate the sector bitmaps of the full backup file 304, parses the sector bitmaps of the full backup file 304 to determine that the client blocks 1-12,288 are stored in payload blocks 0-5. As necessary, the backup/restore application 218 can use any block allocation table to locate the sector bitmaps of any corresponding backup file, and parse the sector bitmaps of the corresponding backup file to determine that which client blocks are stored in the corresponding payload blocks.

Each sector bitmap block contains a bit for each logical sector in a backup file, representing whether the corresponding volume sector is present in the backup file. For each bit, a value of 1 indicates that the payload block's data for the corresponding volume sector should be retrieved from the corresponding backup file, while a value of 0 indicates that the corresponding data should be retrieved from the corresponding parent backup file, which is the preceding backup file that stores the corresponding data for this volume sector. The number of sectors that can be described in each sector bitmap block can be $2^{23}$, so the number of bytes described by a single sector bitmap block can be $2^{23}$ multiplied by the logical sector size, which may be referred to as the chunk ratio. Although this example is based on a sector bitmap that contains 1 MB of bits, a sector bitmap may contain any amount of bits. A virtually contiguous, chunk-size aligned, and chunk-sized portion of a volume may be referred to as a chunk. The chunk ratio is the number of payload blocks in a chunk, or equivalently the number of payload blocks per sector bitmap block. The chunk ratio may equal $2^{23}$ multiplied by the logical sector size and divided by the block size. Even though each of the backup files 304, 308, and 312 includes 1 sector bitmap interleaved after every 4 payload blocks, the ratio of sector bitmap blocks to payload blocks may be any number.

Each payload block can be represented by a block allocation table (BAT) entry in the VHDx format. A block allocation table may be a region consisting of a single array of 64-bit values, with an entry for each payload block or sector bitmap block that identifies the state and the file offset of that block. The entries for the payload blocks and the sector bitmap blocks may be interleaved in a way that the sector bitmap entry associated with a chunk follows the entries for the payload blocks in that chunk.

After identifying at least one data block that was used, the backup/restore application 218 recovers at least one data block, corresponding to the identified at least one data block, from at least one backup file for the system, without reading each data block backed up via the at least one backup file for the system. For example, the backup/restore application 218 only recovers the identified payload blocks 0-5 from the backup files 304, 308, and 312, and does not read or recover payload block 6 from the backup files 304, 308, and 312.

Having recovered at least one data block, the backup/restore application 218 restores the client based on the recovered at least one data block. For example, the backup/restore application 218 restores the recovered payload blocks 0-5 to the first client 202, having recovered only 6 payload blocks (payload blocks 0-5) and restored only 6 payload blocks (payload blocks 0-5), instead of recovering 7 payload blocks (payload blocks 0-6) and restoring 7 payload blocks (payload blocks 0-6), as would have been required by any previous type of backup/restore application.

FIG. 3 illustrates a diagram of example blocks for check point recovery based on identifying used blocks for block-based backup files, under an embodiment. For example, the backup/restore application 218 creates the first backup allocation table, the full backup allocation table 302, the first backup file, the full backup file 304, the second backup allocation table, the first incremental backup allocation table 306, the second backup file, the first incremental backup file 308, the third backup allocation table, the second incremental backup allocation table 310, the third backup file, the second incremental backup file 312, and a merged file 314 based on the backup file 304, 308, and 312. Although FIG. 3 describes three backup files 304, 308, and 312 as the basis for the merged file 314, the backup/restore application 218 may create the merged file 314 based on any number of backup file 304, 308, and 312. While each of the backup files 304, 308, and 312 includes 7 payload blocks and 2 sector bitmaps, each of the backup files 304, 308, and 312 may include any number of payload blocks and any number of sector bitmaps.

The backup/restore application 218 can use a single pass approach to generate a single merged file 314 that contains the merged data from previous backup files 304, 308, and 312 in a sequential manner, and then stream the merged file 314 to the target client's volume. The merge granularity can be a payload block, which can vary from 1 MB to 256 MB according to the Microsoft Windows® VHDx specification. The backup/restore application 218 can merge payload blocks identified for recovery from the backup files 304, 308, and 312 into one merged payload block at a time, and then proceed to merge the next payload block identified for recovery.

Each incremental backup file stores only the blocks that changed after the creation of the previous backup file. Whenever the backup/restore application 218 creates an incremental backup file, a change block tracking driver informs the backup/restore application 218 which blocks changed after the previous backup file, and then clears its own internal state to begin tracking the blocks that are changed after the backup file that is currently being created. Therefore, the change block tracking driver can identify the blocks that changed after the most recent backup file, but cannot identify the blocks that changed prior to the most recent backup file. Consequently, the backup/restore application 218 identifies the blocks to be recovered by using the backup allocation tables for the previous backup files to identify sector bitmaps for the previous backup files, and parsing the sector bitmaps for the previous backup files, such as the incremental backup files 308 and 312. The backup/restore application 218 can parse the sector bitmaps for a backup file to identify the client blocks stored by the backup file's payload blocks.

After identifying the used client blocks to recover, the backup/restore application 218 can calculate where these identified client blocks are stored in each backup file's payload blocks. A volume block number is the identified client block to recover, and a disk offset is the volume block number where disk information starts in a VHDx file, which has its header followed by the disk information. Therefore, this calculation can be based on:

block allocation table array index=(volume block number+disk offset)/chunk ratio.

For example, volume block number 100 MB divided by a chunk ratio of 2 MB equals block allocation table array index 50.0, or the $50^{th}$ payload block in a backup file. In another example, volume block number 24 kB divided by a chunk ratio of 2 MB equals block allocation table array index 0.01, or the $1^{st}$ payload block in a backup file. In yet another example, volume block number 12,465 divided by a chunk ratio of 2,048 equals block allocation table array index 6.1, or the $7^{th}$ payload block in a backup file. Each block allocation table array index represents one payload block. The backup/restore application 218 can use each block allocation table array index for a backup file to recover the payload blocks that store the used client blocks that are identified for recovery. Since the client block size can be smaller than the payload block size, the backup/restore application 218 can recover only the identified client blocks from the payload blocks for each incremental backup file. The array of backup file descriptors ranges from the 0th entry that contains a full backup file, such as the full backup file 304, to the N−1 entry that contains the last incremental backup file, such as the second incremental backup file 312.

The array of block allocation tables ranges from the $0^{th}$ entry that contains the block allocation table for a full backup file, such as the full backup allocation table 302, to the N−1 entry that contains the block allocation table for the last incremental backup file, such as the second incremental backup allocation table 310. Each block allocation table includes entries that range from the $0^{th}$ entry for the $1^{st}$ payload block, such as payload block 0, to the N−1 entry, such as sector bitmap 1.

In summary, first the backup/restore application 218 can identify the level of the backup file to be recovered based on the user-specified checkpoint, assign this level to the recovery level, and initialize a vector for the payload blocks to be recovered. Then the backup/restore application 218 can identify the used client blocks to be recovered from disk layout files, and assign the payload blocks that store these used client blocks to the vector for the payload blocks to be recovered. Next the backup/restore application 218 can identify the relevant backup files and assign them to a backup list. Starting with the backup file after the recovery level and ending with the most recent backup file, the backup/restore application 218 can identify the used client blocks stored by each incremental backup file and append the payload blocks that store these used client blocks to the vector for the payload blocks to be recovered. Finally, the backup/restore application 218 can create a merged file based on the backup files in the backup list for each payload block in the vector for the payload blocks to be recovered, and create the merged file on the fly to recover the requesting client to the state specified by the checkpoint.

For example, the backup/restore application 218 identifies the level of the backup file to be recovered based on the user-specified checkpoint for the second incremental backup file 312, assigns this level to the recovery level, and initializes a vector for the payload blocks to be recovered. Then the backup/restore application 218 identifies the used client blocks 1-12,288 to be recovered from the disk layout files for the backup files 304, 308, and 312, and assigns payload blocks 0-5 that stores these used client blocks 1-12,288 to the vector for the payload blocks to be recovered. Next the backup/restore application 218 identifies the relevant backup files 304, 308, and 312, and assigns them to a backup list. Finally, the backup/restore application 218 creates the payload blocks 0-5 of the merged file 314 based on the backup files 304, 308, and 312 in the backup list for the payload blocks 0-5 in the vector for the payload blocks to be recovered, and creates the payload blocks 0-5 of the merged file 314 on the fly to recover the requesting client 202 to the state specified by the checkpoint.

For this example, the backup/restore application 218 identifies that client blocks 1-12,288 were being used when the most recent backup was created, calculates that client blocks 1-2,048 are stored in payload block 0, and recovers the required blocks (1 kB, 3 kB) and (12 kB, 2,036 kB) of payload block 0 from the full backup file 304. Next, the backup/restore application 218 uses the first incremental backup allocation table 306 to locate the sector bitmap 0 of the first incremental backup file 308, and parses the sector bitmap 0 of the first incremental backup file 308 to identify and recover the extent (0 kB, 1 kB) and the extent (4 kB, 8 kB) from payload block 0 of the first incremental backup file 308. Then the backup/restore application 218 uses the second incremental backup allocation table 310 to locate the sector bitmap 0 of the second incremental backup file 312, and parses the sector bitmap 0 of the second incremental backup file 312 to identify and recover the extent (4 kB, 2 kB) from payload block 0 of the second incremental backup file 312. Consequently, the backup/restore application 218 creates the merged payload block 0 of the merged file 314 by merging the extent (0 kB, 1 kB) from the first incremental backup file 308, the extent (1 kB, 3 kB) from the full backup file 304, the extent (4 kB, 2 kB) from the second incremental backup file 312, the extent (6 kB, 6 kB) from the first incremental backup file 308, and the extent (12 kB, 2,036 kB) from the full backup file 304.

To create the merged payload block 1 of the merged file 314, the backup/restore application 218 recovers the required blocks (0 kB, 20 kB) and (24 kB, 2,024 kB) of payload block 1 from the full backup file 304. Next, the backup/restore application 218 uses the second incremental backup allocation table 310 to locate the sector bitmap 0 of the second incremental backup file 312, and parses the sector bitmap 0 of the second incremental backup file 312 to identify and recover the extent (20 k, 4 k) from payload block 1 of the second incremental backup file 312. Consequently, the backup/restore application 218 creates the merged payload block 1 of the merged file 314 by merging the extent (0 kB, 20 kB) from the full backup file 304, the extent (20 kB, 4 kB) from the second incremental backup file 312, and the extent (24 kB, 2,024 kB) from the full backup file 304.

To create the merged payload block 2 of the merged file 314, the backup/restore application 218 recovers the required blocks (0 kB, 16 kB) and (48 kB, 2,000 kB) of payload block 2 from the full backup file 304. Next, the backup/restore application 218 uses the first incremental backup allocation table 306 to locate the sector bitmap 0 of the first incremental backup file 308, and parses the sector bitmap 0 of the first incremental backup file 308 to identify and recover the extent (16 kB, 32 kB) from payload block 2 of the first incremental backup file 308. Consequently, the backup/restore application 218 creates the merged payload block 2 of the merged file 314 by merging the extent (0 kB, 16 kB) from the full backup file 304, the extent (16 kB, 32 kB) from the first incremental backup file 308, and the extent (48 kB, 2,000 kB) from the full backup file 304.

To create the merged payload block 3 of the merged file 314, the backup/restore application 218 recovers all 2,048 k of payload block 3 from the full backup file 304. Consequently, the backup/restore application 218 creates the payload block 3 of the merged file 314 from the extent (0 kB, 2,048 kB) from the full backup file 304.

To create the merged payload block 4 of the merged file 314, the backup/restore application 218 recovers all 2,048 k of payload block 4 from the full backup file 304. Consequently, the backup/restore application 218 creates the payload block 4 of the merged file 314 from the extent (0 kB, 2,048 kB) from the full backup file 304.

To create the merged payload block 5 of the merged file 314, the backup/restore application 218 recovers the required blocks (0 kB, 128 kB) and (132 kB, 1,916 kB) of payload block 5 from the full backup file 304. Next, the backup/restore application 218 uses the second incremental backup allocation table 310 to locate the sector bitmap 1 of the second incremental backup file 312, and parses the sector bitmap 1 of the second incremental backup file 312 to identify and recover the extent (128 kB, 4 kB) from payload block 5 of the second incremental backup file 312. Consequently, the backup/restore application 218 creates the merged payload block 5 of the merged file 314 by merging the extent (0 kB, 128 kB) from the full backup file 304, the extent (128 kB, 4 kB) from the second incremental backup file 312, and the extent (132 kB, 1,916 kB) from the full backup file 304.

In contrast, the backup/restore application 218 does not create the merged payload block 6 because only payload blocks 0-5 are used. Finally, the backup/restore application 218 uses the merged payload blocks 0-5 of the merged file 314 to restore the requesting client 202.

Figure 4:
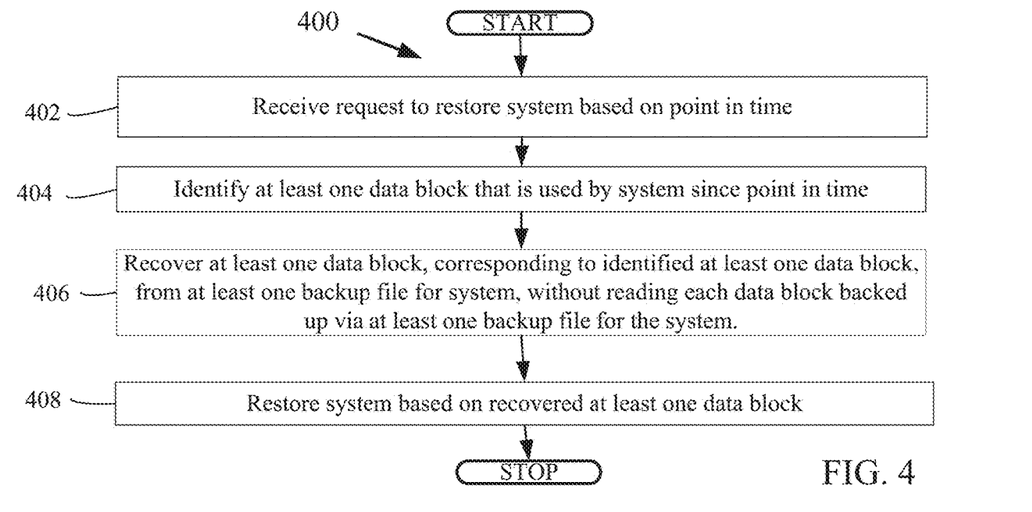
FIG. 4 is a flowchart that illustrates a method of check point recovery based on identifying used blocks for block-based backup files, under an embodiment.

FIG. 4 is a flowchart that illustrates a method for check point recovery based on identifying used blocks for block-based backup files, under an embodiment. Flowchart 400 illustrates method acts illustrated as flowchart blocks for certain steps involved in and/or between the clients 202-206 and/or the server 208 of FIG. 2 and also involving the blocks 302-314 of FIG. 3.

A request is received to restore a system based on a point in time, block 402. For example, the backup/restore application 218 receives a request from the system user to restore the first client 202 to the state of the most recent backup file, which is the second incremental backup file 312.

Having received the request to restore the system, at least one data block is identified that is used by the system since the point in time, block 404. For example, the backup/restore application 218 uses the disk layout files for the backup files 304, 308, and 312 to identify that client blocks 1-12,288 were used when the most recent backup file was created, and identify that payload blocks 0-5 store the used client blocks 1-12,288.

After identifying at least one data block that was used, at least one data block, corresponding to the identified at least one data block, is recovered from at least one backup file for the system, without reading each data block backed up via the at least one backup file for the system, block 406. For example, the backup/restore application 218 only recovers payload blocks 0-5 from the backup files 304, 308, and 312, and does not read or recover payload block 6 from the backup files 304, 308, and 312.

Having recovered at least one data block, the system is restored based on the recovered at least one data block, block 408. For example, the backup/restore application 218 restores the recovered payload blocks 0-5 to the first client 202, having recovered only 6 payload blocks (payload blocks 0-5) and restored only 6 payload blocks (payload blocks 0-5), instead of recovering 7 payload blocks (payload blocks 0-6) and restoring 7 payload blocks (payload blocks 0-6), as would have been required by any previous type of backup/restore application.

Although FIG. 4 depicts the blocks 402-408 occurring in a specific order, the blocks 402-408 may occur in another order. In other implementations, each of the blocks 402-408 may also be executed in combination with other blocks and/or some blocks may be divided into a different set of blocks.

Figure 5:
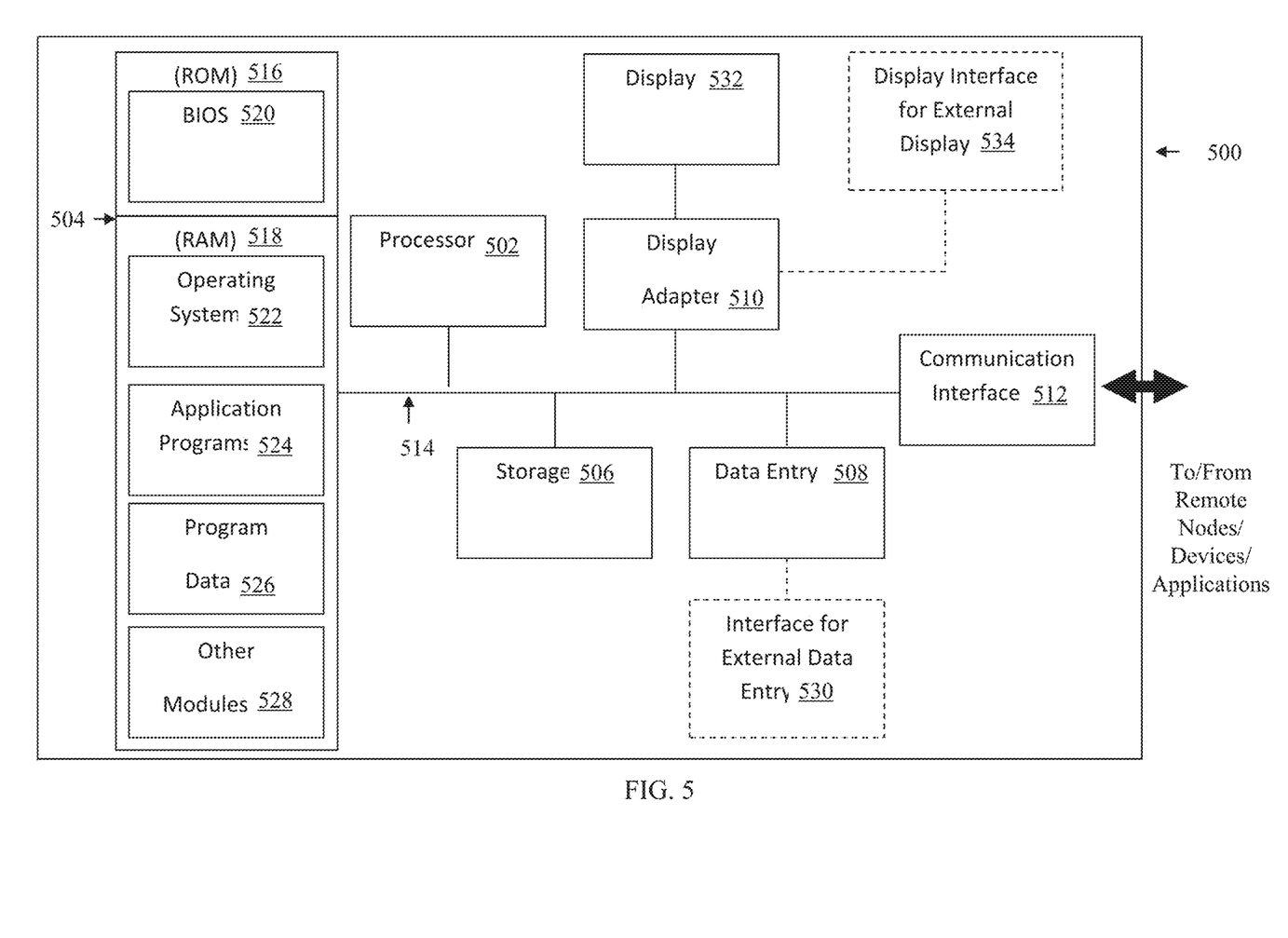
FIG. 5 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, memory 504, storage 506, a data entry module 508, a display adapter 510, a communication interface 512, and a bus 514 that couples the elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include read only memory (ROM) 516 and random access memory (RAM) 518. The memory 504 may be configured to store program instructions and data during operation of the hardware device 500. In various embodiments, the memory 504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user may enter commands and information into the hardware device 500 through the data entry module 508. The data entry module 508 may include mechanisms such as a keyboard, a touch screen, a pointing device, etc. Other external input devices (not shown) are connected to the hardware device 500 via an external data entry interface 530. By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via an external display interface 534. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for check point recovery based on identifying used blocks for block-based backup files of a volume, the system comprising:
   a processor; and
   a processor-based application, which when executed on a computer, will cause the processor to:
   receive a request to restore the volume that was backed up at a user specified time;
   initialize a vector for payload blocks to be recovered;
   identify, in response to the receiving the request to restore the volume, data blocks within a plurality of backup files of the volume that were being used at the user specified time and data blocks that were unused at the user specified time, the identifying being performed using a disk layout files that lists used and unused data blocks within the corresponding backup files, the unused blocks having been deleted before the user specified time, the plurality of backup files includes a full backup file and a plurality of corresponding incremental backup files;

assign to the initialized vector the payload blocks that store the identified used data blocks in the plurality of backup files;

assign each of the backup files that store the payload blocks to a backup list;

recover only the data blocks that were being used at the user specified time as identified from the disk layout file by: (i) identifying the used data blocks stored in each of the incremental backup files, (ii) appending the payload blocks that store identified used data blocks to the initialized vector, and (iii) creating a merged file based on the backup files in the backup list for each payload block in the vector, the recovering being performed without reading each data block backed up via the at least one backup file for the system; and restore the volume by restoring only the used data blocks within the merged file that were being used at the user specified time as identified from the disk layout file.

2. The system of claim 1, wherein the identifying the data blocks further comprises identifying a data block backed up via a first sequential backup file of the at least one backup file for the system, identifying a data block backed up via a last sequential backup file of the at least one backup file for the system, and identifying a data block backed up via any sequential backup file, of the at least one backup file for the system, that is between the first sequential backup file and the last sequential backup file.

3. The system of claim 1, wherein the identifying the data blocks further comprises reading a block map.

4. The system of claim 3, wherein the block map comprises a bitmap that specifies whether each data block in a group of data blocks is one of used at the user specified time and unused at the user specified time.

5. The system of claim 1, wherein the recovering without reading each data block backed up via the at least one backup file for the system comprises bypassing reading each data block that corresponds to any data block that is identified as unused by the system since the user specified time.

6. A computer-implemented method for check point recovery based on identifying used blocks for block-based backup files of a volume, the method comprising:

receiving a request to restore the volume that was backed up at a user specified time;

initializing a vector for payload blocks to be recovered;

identifying, in response to the receiving the request to restore the volume, data blocks within a plurality of backup files of the volume that were being used at the user specified time and data blocks that were unused at the user specified time, the identifying being performed using a disk layout files that lists used and unused data blocks within the corresponding backup files, the unused blocks having been deleted before the user specified time, the plurality of backup files includes a full backup file and a plurality of corresponding incremental backup files;

assigning to the initialized vector the payload blocks that store the identified used data blocks in the plurality of backup files;

assigning each of the backup files that store the payload blocks to a backup list;

recovering only the data blocks that were being used at the user specified time as identified from the disk layout file by: (i) identifying the used data blocks stored in each of the incremental backup files, (ii) appending the payload blocks that store identified used data blocks to the initialized vector, and (iii) creating a merged file based on the backup files in the backup list for each payload block in the vector, the recovering being performed without reading each data block backed up via the at least one backup file for the system; and restoring the volume by restoring only the used data blocks within the merged file that were being used at the user specified time as identified from the disk layout file.

7. The method of claim 6, wherein identifying the at least one data block comprises using the disk layout file to identify a data block that is used by the system since the user specified time.

8. The method of claim 6, wherein the identifying the data blocks further comprises identifying a data block backed up via a first sequential backup file of the at least one backup file for the system, identifying a data block backed up via a last sequential backup file of the at least one backup file for the system, and identifying a data block backed up via any sequential backup file, of the at least one backup file for the system, that is between the first sequential backup file and the last sequential backup file.

9. The method of claim 6, wherein the identifying the data blocks further comprises reading a block map.

10. The method of claim 9, wherein the block map comprises a bitmap that specifies whether each data block in a group of data blocks is one of used at the user specified time and unused at the user specified time.

11. The method of claim 6, wherein the point in time is associated with a backup file, of the at least one backup of the system, that sequentially precedes a use of the at least one data block that is used by the system since the user specified time.

12. The method of claim 6, wherein the recovering without reading each data block backed up via the at least one backup file for the system, comprises bypassing reading each data block that corresponds to any data block that is identified as unused by the system since the user specified time.

13. A computer program product, comprising a non-transitory computer-readable medium having a computer-readable program code embodied therein to be executed by one or more processors, the program code including instructions to:

receive a request to restore the volume that was backed up at a user specified time;

initialize a vector for payload blocks to be recovered;

identify, in response to the receiving the request to restore the volume, data blocks within a plurality of backup files of the volume that were being used at the user specified time and data blocks that were unused at the user specified time, the identifying being performed using a disk layout files that lists used and unused data blocks within the corresponding backup files, the unused blocks having been deleted before the user specified time, the plurality of backup files includes a full backup file and a plurality of corresponding incremental backup files;

assign the payload blocks that store the identified used data blocks in the plurality of backup files to the initialized vector;

assign each of the backup files that store the payload blocks to a backup list;

recover only the data blocks that were being used at the user specified time as identified from the disk layout file by: (i) identifying the used data blocks stored in each of the incremental backup files, (ii) appending the payload blocks that store identified used data blocks to the initialized vector, and (iii) creating a merged file based on the backup files in the backup list for each payload block in the vector, the recovering being performed without reading each data block backed up via the at least one backup file for the system; and restore the volume by restoring only the at used data blocks within the merged file that were being used at the user specified time as identified from the disk layout file.

14. The computer program product of claim 13, wherein identifying the at least one data block comprises using the disk layout file to identify a data block that is used by the system since the user specified time.

15. The computer program product of claim 13, wherein the identifying the data blocks further comprises identifying a data block backed up via a first sequential backup file of the at least one backup file for the system, identifying a data block backed up via a last sequential backup file of the at least one backup file for the system, and identifying a data block backed up via any sequential backup file, of the at least one backup file for the system, that is between the first sequential backup file and the last sequential backup file.

16. The computer program product of claim 13, wherein the identifying the data blocks further comprises reading a block map, and wherein the block map comprises a bitmap that specifies whether each data block in a group of data blocks is one of used at the user specified time and unused at the user specified time.

17. The computer program product of claim 13, wherein the point in time is associated with a backup file, of the at least one backup of the system, that sequentially precedes a use of the at least one data block that is used by the system since the user specified time.

18. The computer program product of claim 13, wherein the recovering without reading each data block backed up via the at least one backup file for the system, comprises bypassing reading each data block that corresponds to any data block that is identified as unused by the system since the user specified time.

* * * * *